United States Patent
Linn et al.

(10) Patent No.: US 10,762,146 B2
(45) Date of Patent: Sep. 1, 2020

(54) CONTENT SELECTION AND PRESENTATION OF ELECTRONIC CONTENT

(71) Applicant: Google Inc., Mountain View, CA (US)

(72) Inventors: Joseph Garrett Linn, San Jose, CA (US); Xingjian Zhang, Sunnyvale, CA (US); Yew Jin Lim, Saratoga, CA (US); Ruben Adamyan, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 221 days.

(21) Appl. No.: 15/660,328

(22) Filed: Jul. 26, 2017

(65) Prior Publication Data
US 2019/0034530 A1    Jan. 31, 2019

(51) Int. Cl.
| | | |
|---|---|---|
| *G06F 16/00* | (2019.01) | |
| *G06F 16/951* | (2019.01) | |
| *G06F 16/248* | (2019.01) | |
| *G06F 16/2458* | (2019.01) | |
| *G06Q 10/10* | (2012.01) | |
| *G06Q 40/00* | (2012.01) | |

(52) U.S. Cl.
CPC .......... *G06F 16/951* (2019.01); *G06F 16/248* (2019.01); *G06F 16/2477* (2019.01); *G06Q 10/10* (2013.01); *G06Q 40/00* (2013.01)

(58) Field of Classification Search
CPC .. G06F 16/951; G06F 16/248; G06F 16/2477; G06Q 10/10; G06Q 40/00
See application file for complete search history.

(56) References Cited

U.S. PATENT DOCUMENTS

| | | | | |
|---|---|---|---|---|
| 9,026,516 | B1 * | 5/2015 | Chapin | G06F 16/9537 707/706 |
| 2005/0131935 | A1 * | 6/2005 | O'Leary | G06F 16/313 |
| 2007/0094295 | A1 * | 4/2007 | Klehr | G06Q 10/10 |
| 2007/0136296 | A1 * | 6/2007 | Molesky | G06Q 10/063 |
| 2010/0205128 | A1 * | 8/2010 | Nolan | G06F 16/9535 706/13 |

(Continued)

OTHER PUBLICATIONS

International Search Report and Written Opinion issued in International Application No. PCT/US2017/057334, dated Feb. 1, 2018, 13 pages.

*Primary Examiner* — Tarek Chbouki
(74) *Attorney, Agent, or Firm* — Middleton Reutlinger

(57) ABSTRACT

Methods, systems, and apparatus, including computer programs encoded on a computer storage medium, for receiving multiple resources, each resource including electronic media content. For each resource, a computing system identifies one or more entities that are associated with the resource. For at least one pair of identified entities, the system determines a quantity of resources in which each entity of the pair is associated. The system determines, based on the quantity of resources, an occurrence of an event that is associated with a particular pair of entities. The system generates a representation that corresponds to the event and based on the resources in which each entity of the pair of entities is associated. The system provides, for output to a user device, the representation that corresponds to the event.

20 Claims, 4 Drawing Sheets

(56) References Cited

U.S. PATENT DOCUMENTS

| | | | |
|---|---|---|---|
| 2013/0159325 A1* | 6/2013 | Polonsky | G06F 16/335 |
| | | | 707/754 |
| 2014/0280575 A1* | 9/2014 | Cowan | H04L 67/22 |
| | | | 709/204 |
| 2015/0006512 A1* | 1/2015 | Alfonseca | G06F 17/24 |
| | | | 707/722 |
| 2015/0088598 A1* | 3/2015 | Acharyya | G06Q 30/00 |
| | | | 705/7.29 |
| 2016/0027044 A1 | 1/2016 | Sharifi et al. | |
| 2016/0357872 A1* | 12/2016 | Fader | G06Q 10/00 |
| 2018/0082183 A1* | 3/2018 | Hertz | G06Q 10/10 |

* cited by examiner

CONTENT SELECTION AND PRESENTATION OF ELECTRONIC CONTENT

FIELD

The present specification relates to content selection and presentation.

BACKGROUND

Computing systems may be configured to gather data from multiple webpages and organize the gathered data into a searchable index of information. The gathered data can be in a structured or unstructured data format. For example, computing systems can receive structured or unstructured data for resources that include electronic media content, such as articles and other electronic publications. Users that consume media content may desire to receive a subset of media content that is identified as being associated with certain interests or content preferences of the user.

SUMMARY

According to the described technologies, a computing system receives multiple resources. The resources may include electronic media content and at least a portion of text content. For each resource, the system can identify one or more entities that are associated with the resource. The entities can span a variety of information types and may include individual persons, political entities, entertainment entities, or business entities. Entity pairs can be identified by the system and, for each pair of identified entities, the system may determine a quantity of resources in which each entity of the pair is associated.

The system may then determine an occurrence of an event that is associated with a particular pair of entities. An event occurrence may be determined based on the quantity of resources in which each entity of the pair is associated. The system generates a representation that corresponds to the event. The representation may be generated based on the resources in which each entity of the pair of entities is associated. The system can provide the presentation for output to a user device.

One aspect of the subject matter described in this specification can be embodied in a computer-implemented method. The method includes receiving, by a computing system, multiple resources, each resource including electronic media content including at least a portion of text content; for each resource of the multiple resources: identifying, by the computing system, one or more entities associated with the resource; for at least one pair of entities of the one or more identified entities: determining, by the computing system, a quantity of resources in which each entity of the pair of entities is associated.

The method includes determining, by the computing and based on the determined quantity of resources, an occurrence of an event that is associated with a particular pair of entities; generating, by the computing system, a representation that corresponds to the event, the representation being generated based on one or more of the resources in which each entity of the pair of entities is associated; and providing, by the computing system and for output to a user device, the representation that corresponds to the event.

These and other implementations can each optionally include one or more of the following features. For example, in some implementations, the method further includes: detecting particular entity terms included in the text content of the resource, the particular entity terms being detected based on a known interest of a user; and in response to detecting the particular entity terms, selecting one or more pairs of entities that are associated with the resource, based on the detected particular entity terms.

In some implementations, identifying the one or more entities associated with the resource, includes: determining at least one interest of a user based on analysis of user data associated with the user, the user data being received during one of: a current time period, or a past time period; and identifying one or more entities associated with the resource based on the determined at least one interest of the user.

In some implementations, determining the occurrence of the event, includes: identifying, using an event detection module of the computing system, multiple candidate events associated with a particular pair of entities; using a filtering algorithm of the event detection module to produce a subset of candidate events associated with the resources in which each entity of the particular pair of entities is included; and determining the occurrence of the event based on at least one event included in the subset of candidate events.

In some implementations, identifying the one or more entities associated with the resource, includes: using at least one collaborative filtering algorithm to determine one or more interests of a first user based at least on an interest of one or more second users; and identifying the one or more entities associated with the resource based on the determined one or more interests of the first user.

In some implementations, identifying the one or more entities associated with the resource, includes: identifying a first entity based on a known interest of a user; determining, using a correlation detection module of the computing system, a second entity that has an association with the identified first entity; and generating at least one pair of identified entities of the one or more entities based on the determined second entity and the identified first entity.

In some implementations, generating the representation that corresponds to the event, includes: generating a narrative about the resource, the narrative providing a summary of the electronic media content included in the resource; populating an interest feed to include the resource and the narrative about the resource, the interest feed being used to provide one or more media content items to a user; and generating the representation that corresponds to the event using the interest feed that includes the resource and the narrative about the resource.

In some implementations, the representation that corresponds to the event includes a particular resource that is selected at least from among the quantity of resources in which each entity of the pair of entities is associated. In some implementations, generating the representation that corresponds to the event, includes: determining a type of the event based on information about the event that is associated with the particular pair of entities; and generating a second representation that includes a content item that is indicative of the type of information that is selected. In some implementations, at least one entity of the particular pair of entities is a business entity, the selected type of information corresponds to financial information, and the content item indicates at least a monetary characteristic of the business entity.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The subject matter described in this specification can be implemented in particular implementations and can result in one or more of the following advantages. The described computing system can predict and identify certain electronic media content and resources that may be of particular interest to one or more users. By predicting and providing targeted media content/resources that sufficiently align with a user's interests or preferences, computational processes of a computer system and a user device can realize improved efficiencies. Computing efficiency can be improved by minimizing needless data processing steps that generate extraneous media content that is not targeted to particular user preferences and, thus, may be discarded by the user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A computing system is described that can receive a variety of structured and unstructured data, such as online article resources and other media content from a variety of data sources. The system is configured to annotate the received data and use the annotated data to automatically bundle and/or cluster certain content that is deemed relevant or interesting to at least one user. In this context, the described subject matter relates to enhancing a user interest feed to include targeted media content and resources that align with particular interests and preferences of a user.

Figure 1:
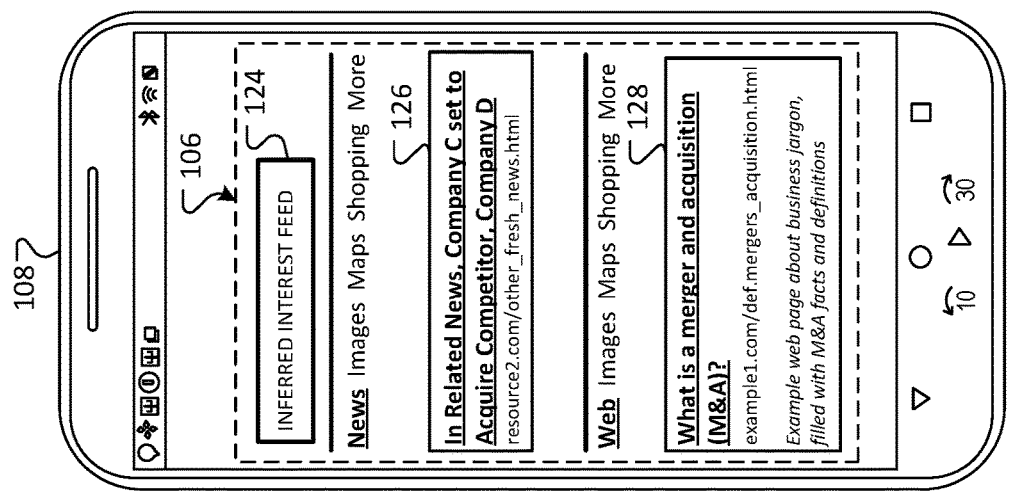
FIG. 1 illustrates multiple interfaces related to interest feeds in an example computing system.
Figure 1:
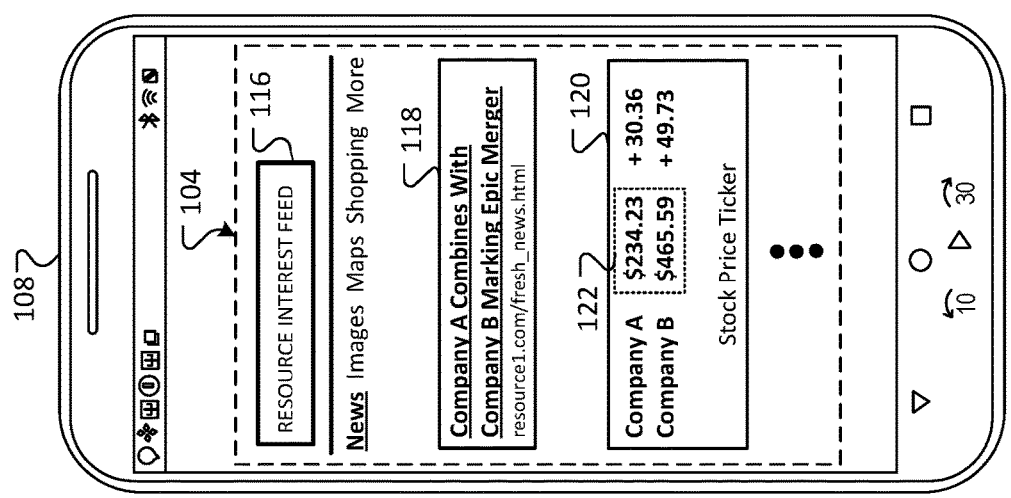
Figure 1:
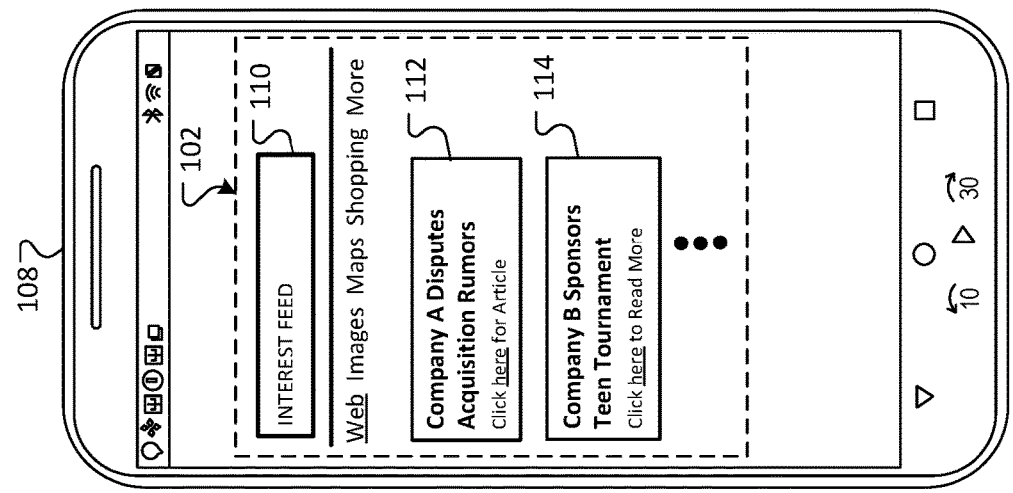

FIG. 1 illustrate multiple interfaces related to interest feeds in an example computing system. The multiple interfaces include interface 102, 104, and 106. Each illustrated interface corresponds to an example graphical representation associated with user interest feed that can be displayed on an example user device 108. As shown in FIG. 1, user device 108 can correspond to a mobile smartphone device.

In some implementations, user device 108 can be one of a variety of computing devices, such as laptop/desktop computers, smart televisions, electronic book/reader devices, digital streaming content devices, gaming consoles, smart watch devices, electronic wearable devices, tablet devices or other related computing devices that are configured to execute software instructions and application programs for providing targeted content to at least one user.

Interface 102 can be displayed on user device 108 and can include an example user interest feed 110. In some implementations, interest feed 110 displays graphical representations corresponding to example media content, such as an online article or other types of resource data. For example, interest feed 110 can include first content 112 and second content 114. As shown, first content 112 can indicate certain activities of an example business entity, Company A, while second content 114 can indicate certain activities of another example business entity, Company B.

First and second content 112, 114 of interest feed 110 can be generated according to one implementation. Content 112, 114 may appear to a user of device 108 as including distinct entities that no have apparent connection or association. In some instances, an underlying connection, association, or shared event involving entities of interest feed 110 may in fact exist. However, in one implementation a system that generates interest feed 110 does not detect the correlation, nor does the system identify available resource content that describes the correlation. Additionally, the system does not infer or predict example second media content to include in a user's interest feed based on the user's preference for a particular first media content.

Interface 104 and interface 106 each show example graphical representations of interest feeds that are enhanced according to the described technologies. As shown, interface 104 and interface 106 can also each be displayed on user device 108. Interface 104 includes resource interest feed 116, while interface 106 includes inferred interest feed 124. Interest feeds 116 and 124 each display graphical representations of example resources/media content, such as an online news article or other types of data that are uniquely identified based on particular interests or preferences of a user.

Interest feed 116 can be populated to include first content 118 and second content 120. Unlike content of interest feed 110, first and second content 118, 120 of interest feed 116 are generated by a computing system that is enhanced according to the described technologies. The enhanced computing system can be configured to identify entities that align with preferences of a user. For example, a user may have an interest or preference for news related to business activities of a first identified entity, e.g., company A, and the enhanced computing system can be configured to use annotated resource data to detect a correlation or association between company A and a second identified entity, company B.

The enhanced system can also detect events that involve the entities and that indicate a connection between the entities, as well as populate resource interest feed 116 to include example electronic articles or other digital resource content about the event and for output to a user via user device 108. In some implementations, the resource can be a web-address for accessing online content that describes or expands on the event which indicates the connection or correlation between the identified entities.

For example, as shown via first content 118, the resource can be a uniform resource locator (URL) for accessing an electronic article, published online, and describing an epic merger event between companies A and B. In some implementations, as shown via second content 120, interest feed 116 can be populated to include additional resource data such as an example stock price ticker showing a respective stock price 122 for shares of companies A and B as well as data about changes to the respective stock price for shares of each company.

Much like interest feed 116, inferred interest feed 124 can be populated to include first content 126 and second content 128 generated by the computing system enhanced according to the described technologies. The enhanced system can perform computations for identifying or detecting events to be included in inferred interest feed 124 based on inferences or predictions that align with, or are relevant/related to, particular interests or preferences of a user.

In some implementations, events can be inferred or predicted by the enhanced system as relevant to a user based also on an event's correlation or connection to another related event that was identified as being interesting to a user. Thus, as noted above, interest feed 124 displays graphical representations of resources/media content about events that are identified based at least on inferences determined using particular user preferences.

For example, as shown via first content 126, information about the inferred event can be accessed via a URL for an online article describing the event as a near-term acquisition of company D by company C. The event indicated via the URL can be predicted as being interesting to a user based on the user's related interest in the business activity of company A, e.g., company A merging with company B. Alternatively, or additionally, the event can be predicted as interesting to a user based on the event's correlation to another related event that was identified as interesting to the user, e.g., events for business activities in general.

In some implementations, as shown via second content 128, interest feed 124 can be populated to include additional resource data. The resource can be a web-address/link for accessing online content that describes or expands on certain data relating to the detected event of first content 126. For example, the resource can be a URL for a webpage describing facts and definitions about mergers and acquisitions (M&A) as well as other business concepts. The additional data can be determined by the enhanced system based on inferences or predictions of the system which relate to the event of first content 126. The inferences or predications can be analytical computations performed by the system to anticipate, identify, and select content that will be interesting to a user based at least on attributes of the event.

For example, a user may have a preference for news related to business activity, e.g., business activity involving at least company A. Further, detected events can indicate M&A type business activity is occurring, or will occur, between company A and at least one other company. Thus, the enhanced system can cause inferred interest feed 124 to be populated with predictions about business definitions or other financial concepts that a user might be interested in learning more about in view of the attributes, e.g., a merger, of business activity in which company A is involved.

Figure 2:
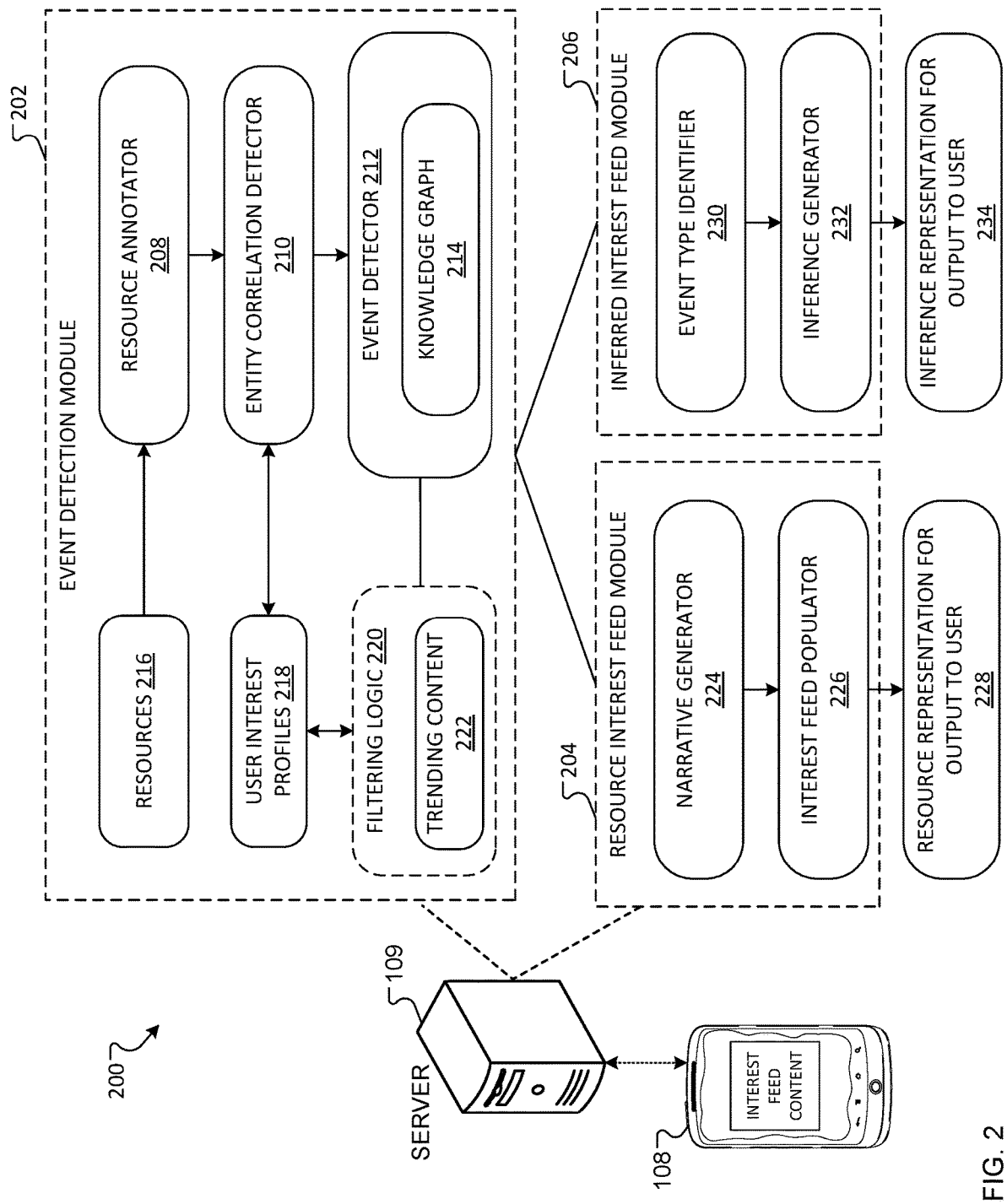
FIG. 2 illustrates a system diagram of an example computing system for populating an interest feed.

FIG. 2 illustrates a system diagram of an example computing system for populating an interest feed. System 200 generally includes an example computing server 109 for generating at least interface 104 and interface 106 described above with reference to FIG. 1. In some implementations, computing functions of server 109 can be executed in an example cloud-based computing system or environment.

System 200 corresponds to the enhanced computing system described above with reference to FIG. 1 and is used to generate interface 104 and interface 106 displayed using user device 108. Hence, system 200 can be configured to accurately detect underlying connections, associations, or shared events involving two or more entities based on preferences or interest of a user. System 200 can be also configured to identify and provide, for output to a user, available resource or media content that describes the correlation, e.g., online article about merger events.

System 200 can also identify and provide, for output to a user, additional content related to the event that indicates the correlation. For example, the additional content may be a respective stock price for two merging companies. System 200 can be further configured to identify or detect events and related data based on inferences or predictions that align with certain user preferences. In some implementations, events and related data can be inferred using an event's connection to another related event identified by system 200 as being interesting to a user.

Referring to FIG. 2, server 109 generally includes an event detection module 202, a resource interest feed module 204, and an inferred interest feed module 206. In some implementations, modules 202, 204, and 206 are each collectively or individually included in, or accessible by, server 109. Additionally, the described functional and computational processes of modules 202, 204, and 206 can be enabled by computing logic or programmed instructions executable by processors and memory associated with server 109.

As used in this specification, the term "module" is intended to include, but is not limited to, one or more computers/computing devices configured to execute software programs that include program code that causes a processing unit(s) of the computing device to execute one or more functions. The term "computer" is intended to include any data processing or computing devices/systems, such as a desktop computer, a laptop computer, a mainframe computer, a personal digital assistant, a server, a handheld device, or any other device able to process data.

Server 109 can include one or more processors, memory, and data storage devices that collectively form one or more computing systems of server 109. The processors of the computing systems process instructions for execution by server 109, including instructions stored in the memory or on the storage device to display graphical information for a graphical user interface (GUI) via an example display of user device 108. Execution of the stored instructions can cause one or more of the actions described herein to be performed by server 109 or user device 108.

In other implementations, multiple processors may be used, as appropriate, along with multiple memories and types of memory. For example, server 109 may be connected with multiple other computing devices, with each device (e.g., a server bank, groups of servers, modules, or a multi-processor system) performing portions of the actions or operations associated with the various processes or logical flows described in this specification.

Referring again to FIG. 2, event detection module 202 includes a resource annotator 208, an entity correlation detector 210, and an event detector 212. Module 202 further includes multiple resources 216, user interest profiles 218, and filtering logic 220. Annotator 208 can be used by system 200 to annotate each of the multiple resources 216 or media content that are received by server 109. For example, annotator 208 can annotate each received resource by scanning or analyzing entity or content data about the resource.

In some implementations, to annotate resources 216, annotator 208 analyzes signal data associated with individual entities or other content included in respective resources 216. Based on this signals analysis, annotator 208 can identify and/or extract one or more entities included in content data for or about each resource 216. In some implementations, extracted entities are stored in a memory of server 109. Stored entities may then be accessed and used by modules of server 109 to perform computations for populating resource interest feed 116 or inferred interest feed 124.

As described above, entities of resources 216 can span a variety of information types. For example, entities of resources 216 may include individual persons, governmental and political entities, sports and entertainment entities, or business, scientific, and academic entities. As noted above, in some instances, two or more entities may have a connection or correlation and an example event involving the two entities can be included in at least one resource item of resources 216.

Entity correlation detector 210 can receive clusters of annotated resource items and the identified entities from annotator 208. For example, correlation detector 210 can receive clusters of multiple electronic articles including associated names or identifiers of individual entities included in the articles. In some implementations, for each resource of the cluster of multiple resources, correlation detector 210 can analyze the resources and, based on the analysis, identify one or more entities, identify correlations between resources, or identify correlations between entities associated with respective resources.

For example, correlation detector 210 can analyze resources to detect or determine data similarities or related data between electronic text or digital images of multiple resources or media content. In some implementations, correlation detector 210 uses the relative location of certain text or image content of each resource, e.g., title/heading of an article, to determine resource or entities correlations between respective resources.

In response to determining the data similarities, correlation detector 210 can identify correlations between resources or identify correlations between entities associated with respective resources based at least on a quantity of detected data similarities. For example, correlation detector 210 can determine a quantity of resources that have detected data similarities that may indicate a correlation or association between two or more entities.

Correlation detector 210 can then identify two or more entities that have a correlation or association based on the determined quantity of resources. In some instances, correlation detector 210 identifies the two or more entities based on the determined quantity of resources exceeding a threshold quantity.

In some implementations, correlation detector 210 uses the clusters of annotated resources to identify at least one entity that aligns with, or that is associated with, an interest or preference of a user. Correlation detector 210 can then determine at least one other entity that has an association or correlation with the at least one entity and/or that also aligns with an interest or preference of the user. In some instances, correlation detector 210 analyzes resources of the cluster to identify pairs of entities based on preferences of a user and/or based on resource or entity correlations determined using detected data similarities.

For example, correlation detector 210 can use entity names of companies or persons included in respective electronic articles of a cluster to identify at least one entity, company A, that aligns with a business activity interest of a user. Correlation detector 210 can then determine at least one other entity, e.g., company B, that has an association or correlation with company A and based on the business activity interest/preference of the user.

In some instances, entities company A and company B can be identified based on a first electronic article having company A in the title of the first article and based on a second electronic article having company B in the title of the second article. Additionally, a correlation between company A and company B can be determined, for example, based on one or more detected similarities amongst respective text/image content of the first article about company A and the second article about company B.

As described in more detail below, in addition to correlation detector 210, server 109 and system 200 can use other computing logic of module 202 to determine a first entity and one at least one other entity that is associated with the first entity. For example, module 202 can be used to track at least one trending topic. Trending topics can be determined based on data, e.g., unstructured data, associated with multiple user search queries. Module 202 can then determine entity correlations based on a quantity of resources that describe or include entities or other content that correspond to one or more trending topics (described below).

In some instances, rather than pairs of entities, correlation detector 210 can be configured to detect or identify multiple entities, or identify multiple pairs of entities. Correlation detector 210 can be also configured to detect multiple sets of entities, where a set of entities includes two or more entities.

Correlation detector 210 can access user interest profiles 218 to obtain or determine one or more preferences of a user for identifying the entities. In some implementations, user profiles 218 can be associated with an example user account and may be populated with user preferences based on interests/preferences defined by the user through a user account profile. Additionally, or alternatively, user profiles 218 can be populated with user preferences based on interests or preferences associated with a user's online browsing activity or based on a variety of other online resources about the user or a variety of account profiles of the user.

In some implementations, correlation detector 210 generates respective resource and entity scores that indicate an estimated magnitude of relevance of an electronic resource 216 and its entities to particular interests of respective users. For example, an article resource can include a title of the article and a body of the article that describes the substance of the article. For users that have an interest in business activities of various companies, an electronic article that includes company A in the title, and multiple references to company A throughout the body, may receive a relatively high resource-entity score, e.g., 0.9.

However, an electronic article that includes restaurant X in the title, but only a few references to company A throughout the body, may receive a relatively low resource-entity score, e.g., 0.2. Correlation detector 210 can use the resource-entity scores to select a subset of resources and corresponding entities from which related entities and one or more events can be identified or detected. For example, correlation detector 210 can select a subset of electronic articles and corresponding individual or company names of the articles that have respective resource-entity scores that exceed a threshold score (e.g., 0.7).

In general, correlation detector 210 can use one or more of detected data similarities between resources 216, entity data related to trending topics, or user interest data to identity two or more related entities that are associated with a subset of resources. At least for each pair of identified entities of the two or more related entities, correlation detector 210 can determine a quantity of resources in which each entity of the pair of entities is associated. From the determined quantity of resources, correlation detector 210 can select a subset of resources and corresponding entities from which one or more events can be identified or detected, and where each of the one or more events include the identified related entities.

Event detector 212 receives the subset of resources and corresponding entities, such as entity pairs (or sets) identified and selected by correlation detector 210. The subset of resources can be analyzed by event detector 212 to detect one or more events. For example, event detector 212 can execute software instructions to analyze respective resources and entities that have an apparent association or correlation. Based on this analysis, event detector 212 can detect or identify one or more events described by the resources and that involve at least one entity, at least one entity pair, or at least one set of entities.

For example, as described in more detail below, a resource in the subset of resources can include an electronic article relating to business activities of an entity pair, Company A and Company B. Referencing first content 118 of interface 104, event detector 212 can detect an event that involves company A combining with company B and which relates to an epic merger event in the business industry. The event can be associated with, or described in, a particular resource of the subset of resources received from correlation detector 210.

Event detector 212 can detect one or more events that include the pairs or sets of related entities based on existing associations between one or more entities in the subset of resources. In some implementations, event detector 212 determines an occurrence of an event that is associated with a particular pair of entities based on a determined quantity of resources. For example, event detector 212 can identify multiple candidate events associated with the particular pair of entities based on the subset of resources and then determine an occurrence of an event from among the multiple candidate events.

Event detector 212 can identify at least one event from among the multiple candidate events, where identifying the event includes selecting one or more resources that are associated with the event. In some implementations, the selected resources are electronic articles that are descriptive of the event or that include text or image content about the event. As discussed below, system 200 can provide, for output to a user device, one or more of the selected resources such that the resource can be viewed by a user via a display of the user device.

Filtering logic 220 can be used by event detector 212 (or correlation detector 210) to identify article resources or other media content that are indicative of an event that aligns with at least one interest or preference of a user. For example, and with reference to FIG. 1, the respective electronic articles of first content 112 and second 114 may be included in the subset of resources identified by correlation detector 210 and received by event detector 212. Hence, company A and company B may be respective entities that form a pair of entities identified by correlation detector 210.

Additionally, as shown in FIG. 1, the article of first content 112 may relate to an event involving company A that is related to business activity, namely, acquisition of (or merging with) another company. While, the article of second content 114 may relate to an event involving company B that is only loosely or tangentially related to business activity. Hence, based on a user's preference or interest for articles about business activity, a resource-entity score of the article resource in first content 112 may be slightly higher than a resource-entity score of the article resource in second content 114.

In some implementations, event detector 212 identifies one or more entities associated with at least one article resource to be provided for output to a user. Event detector 212 (or correlation detector 210) can use a collaborative filtering algorithm, e.g., of filtering logic 220, to determine one or more interests of a first user based at least on an interest of one or more second users. Event detector 212 can then filter out or remove at least one event from among the candidate events using the determined interest(s) of the first user.

In some implementations, events may be filtered or removed from the candidate events when the events include entities or relate to other content or activities that do not align with an interest(s) of the first user. In some instances, filtering out an event from among the candidate events includes removing at least one article resource from the subset of resources, where the removed article source is associated with the event.

Filtering logic 220 includes trending content 222 that identifies resource content associated a variety of trending topics. In some instances, trending content 222 can correspond to computing logic for tracking, analyzing, and identifying a variety of resources that relate to trending content/topics. As described above, trending content 222 can be determined based on data associated with multiple user search queries that are received and processed by an example search system, e.g., Google Search. In some implementations, trending content 222 is determined by analyzing a variety of digital news and social media content generated by one or more web-based information systems.

Event detector 212 can use trending content 222 to identify or determine events and article resources that describe or include entities or other content that correspond to one or more trending topics. In some implementations, event detector 212 uses filtering logic 220 and trending content 222 to determine events and article resources that correspond trending topics that also align with interests or preferences of a user.

Event detector 212 can then filter out or remove at least one event from among the candidate events using the determined events that correspond to trending topics. In some implementations, events may be filtered or removed from the candidate events when the events include entities or relate to other content not identified within trending content 222 and/or that do not align with an interest(s) of a user.

Event detector 212 can use knowledge graph 214 to detect one or more events that include the related entities. In some implementations, knowledge graph 214 is used and/or analyzed to determine activities and other content that may be indicative of an event. In some instances, entity sets or pairs can be determined to have a particularly strong association or correlation based on additional correlation data available via knowledge graph 214.

Knowledge graph 214 can be used to select one or more events from among the candidates that are received at modules 204 and 206. For example, event detector 212 can access knowledge graph 214 to obtain data indicative of an event involving at least two entities, where the events and the entities align with certain interests of a user, e.g., a business or engineering interest. In response to obtaining the data from knowledge graph 214, at least one article resource that corresponds to a particular candidate event can be provided to module 204 and/or 206 based on a correlation between the obtained data and the particular candidate event.

Knowledge graph 214 can be represented by any of a variety of convenient physical data structures. For example, knowledge graph 214 can be represented by triples that each represent two entities in order and a relationship from the first to the second entity; for example, [alpha, beta, is the father of], or [alpha, is the father of, beta], are alternative ways of representing the same fact. Each entity and each relationship can be and generally will be included in multiple triples.

Alternatively, each entity can be stored as a node once, as a record or an object, for example, and linked through a linked list data structure to all the relationships the entity has and all the other entities to which the entity is related. More specifically, knowledge graph 214 can be stored as an adjacency list in which the adjacency information includes relationship information. It is generally advantageous to represent each distinct entity and each distinct relationship with a unique identifier.

The entities represented by knowledge graph 214 need not be tangible things or specific people. The entities can include particular people, places, things, artistic works, concepts, events, or other types of entities. Thus, knowledge graph 214 can include data defining relationships between people, e.g., co-stars in a movie; data defining relationships between people and things, e.g., a particular singer recorded a particular song; data defining relationships between places and things, e.g., a particular type of wine comes from a particular geographic location; data defining relationships between people and places, e.g., a particular person was born in a particular city; and other kinds of relationships between entities.

In some implementations, each node has a type based on the kind of entity the node represents; and the types can each have a schema specifying the kinds of data that can be maintained about entities represented by nodes of the type and how the data should be stored. So, for example, a node of a type for representing a person could have a schema defining fields for information such as birth date, birth place, and so on. Such information can be represented by fields in a type-specific data structure, or by triples that look like node-relationship-node triples, e.g., [person identifier, was born on, date], or in any other convenient predefined way. Alternatively, some or all of the information specified by a type schema can be represented by links to nodes in knowledge graph 214; for example, [one person identifier, child of, another person identifier], where the other person identifier is a node in the graph.

Resource interest feed module 204 includes narrative generator 224 and interest feed populator 226. In some implementations, described functions/features of narrative generator 224 and interest feed populator 226 correspond to computational processes of module 204 that are enabled by executable software instructions or computing logic. Resource output 228 generally corresponds to a graphical representation generated for display to a user via an example user device.

System 200 can provide resource output 228 as a resource representation for output to a user via a display of user device 108. For example, as indicated above, event detector 212 selects at least one event from among the multiple candidate events and an electronic article resource associated with the event. In some instances, module 204 receives multiple selected events and article resources that correspond to respective selected events. System 200 causes data for accessing article resources associated with each selected event to be included in interest feeds 116 or 124. Interest feeds 116 and 124 can include data representing resource output 228, where the interest feeds are provided to user device 108 for output at the device.

In some implementations, system 200 generates a representation, e.g., resource output 228, that includes web-links to resources for each selected event and provides the representation for output at user device 108. For example, system 200 can generate resource output 228 based on resources that describe selected events in which each entity of a pair of entities is associated. System 200 can then use interest feed populator 226 to populate interest feed 116 or 124 to include resource output 228 or data relating to contents of resource output 228.

System 200 can use narrative generator 224 to generate a narrative or summary about each resource that corresponds to a particular event. For example, narrative generator 224 can include software instructions for an example data analyzer program that scans or analyzes electronic text, image, or media content of a resource. In response to analyzing content of a resource using the data analyzer, narrative generator 224 can generate a data structure including text, image, or media content for that provides a narrative or summary of the resource.

System 200 can cause each resource summary, and a web-link for each resource of an event, to be included in resource output 228 or in a particular interest feed of FIG. 1. In some implementations, narrative generator 224 can generate text, image, or other data that indicates a reason as to why a particular event, and an article resource for the particular event, was selected for output to a user. In some instances, narrative generator 224 can access user interest profiles 218 to produce data which informs a user why certain event/resource content is being presented in a user's interest feed.

For example, the reason can be that a resource for a particular entity or event is being provided for output to the user based on the user's interest in certain business activities or the user's interest in the particular entity. In some implementations, system 200 causes one or more of the following to be included in resource output 228 or in a particular interest feed of FIG. 1: i) an article resource; ii) a resource summary; iii) a web-link for accessing a resource of an event; and iv) a reason for providing certain web-links or a particular resource that describes a particular event.

Inferred interest feed module 206 includes event type identifier 230 and inference generator 232. In some implementations, described functions/features of event type identifier 230 and inference generator 232 correspond to computational processes of module 206 that are enabled by executable software instructions or computing logic. Similar to resource output 228, inference output 234 generally corresponds to a graphical representation generated for display to a user via the display of user device 108.

System 200 can provide inference output 234 as an inference representation for output to a user. In some implementations, inference output 234 corresponds to a graphical representation of inference data, e.g., webpage, URL for accessing a webpage, or an electronic article, related to a particular event. Inference output 234 can include data related to a particular user interest topic or a particular event selected from among the group of candidate events identified by event detector 212.

As indicated above, system 200 can use inference generator 232 to identify or predicted events to be included in inferred interest feed 124 based on inferences or predictions that align with, or are relevant/related to, particular interests or preferences of a user. In some implementations, system 200 uses inference generator 232 to populate interest feed 124 with additional resource data. The additional resource data can be a web-link for accessing online content that is related to, or that expands on, data about an article resource included in resource output 228.

System 200 can use event type identifier 230 to identify a type of a particular event. For example, event type identifier 230 can include software instructions for analyzing electronic text, image, or media content of a resource that describes an event. In response to analyzing content of a resource, event type identifier 230 can determine a type of the event based on data/information about the event that is associated with the particular pair of entities. System 200 can then use event type identifier 230 to generate a representation that is indicative of the type of the event.

For example, event type identifier 230 can analyze data contents of a resource that describes an event. Based on the analyzed data contents, event type identifier 230 can determine that a type of the event, is a business type event, an engineering type event, a global news type event, an entertainment or social media type event, or any other type of event label that generally describes the event.

Event type identifier 230 can then use the determined event type to generate an example digital banner, e.g., a representation, that includes text or image data indicating the event type. In response to event type identifier 230 determining the event type, system 200 can cause the event type to be included in inference output 234 and to be provided for output to a user via interest feed 124.

Figure 3:
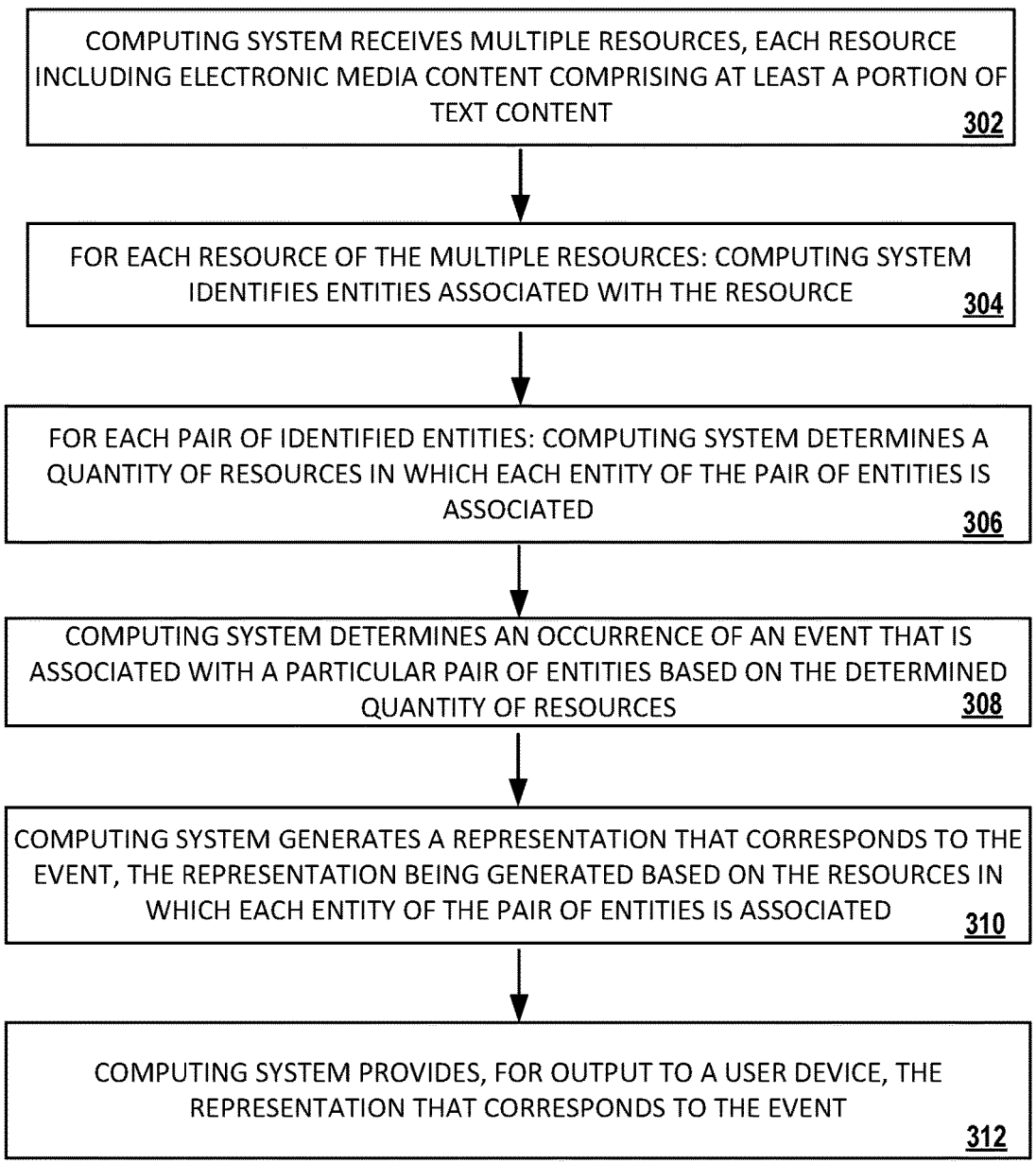
FIG. 3 is a flow diagram of an example process for populating an interest feed.

FIG. 3 is a flow diagram of an example process for populating an interest feed. Process 300 can be implemented using system 200 described above. Thus, descriptions of process 300 may reference one or more of the above-mentioned modules or computational devices of system 200. In some implementations, described actions of process 300 are enabled by computing logic or software instructions executable by a processor and memory of an example electronic device, such as server 109 or user device 108 described above.

At block 302 of process 300, system 200 receives multiple resources, each resource can include electronic media content such as text data, image data, and other media data/content. For example, system 200 can receive multiple electronic articles that include written descriptions and digital pictures relating to a variety of topics. The received articles can correspond to the article references indicated via interfaces 102, 104, and 106.

At block 304, for each resource of the multiple resources, system 200 can identify entities associated with the resource. For example, the articles can describe entities such as company A and company B and system 200 can analyze data contents of the articles to parse, copy, or extract entity names and other text content such as person names or company names.

In some implementations, system 200 analyzes user interest/preference data received in real-time, or stored interest data, to determine that a user is interested in engineering, physics, or other science topics. The system can then identify entities associated with the resource based on the determined interests of the user. For example, the article can include written descriptions about new observations of Albert Einstein's equations on quantum mechanics as interpreted by a popular engineer X at Company Y. Hence, identified entities can include the "engineer X, "company Y," or "Albert Einstein."

At block 306 of process 300, for each pair of identified entities: system 200 determines a quantity of resources in which each entity of the pair of entities is associated. The quantity of resources can form a subset of online articles that describe a variety of data items relating to engineering or physics.

At block 308, system 200 determines an occurrence of an event that is associated with a particular pair of entities based on the determined quantity of resources. Determining an occurrence of an event associated with the entities can include identifying or producing a subset of candidate events and selecting an at least one article that describes the event.

For example, system 200 can determine that a subset of online articles, e.g., 5-10 articles, describe quantum mechanics, Albert Einstein, and/or company X. System 200 can produce a subset of candidate events that relate to physics and/or the entities. The system can then use filtering logic 220 to determine that the user has a particular interest in general relatively rather than quantum mechanics.

System 200 can then determine an occurrence of an event by selecting an online article resource from the subset that describes new observations about Einstein's views of general relativity. The selected article can describe a physics conference event about the theory of relativity and the engineer's panel discussion materials for the event. Alternatively, another selected article can describe an upcoming publication about of a new physics paper describing the engineer's fresh new observations about the theory of relativity.

At block 310 of process 300 system 200 generates a representation that corresponds to the event. The representation can be generated based on the online articles in which each entity of the pair of entities is associated. At block 312 of process 300, system 200 provides, for output to user device 108, the representation that corresponds to the event.

System 200 can use each of modules 204 and 206 to provide an example interest feed that is configured to be a glanceable interest feed that can include a user's favorite content subjects and hobbies as well as include media content related to trending global and local news and other events. For example, the interest feed can include a web-link to the articles about the physics conference event and the upcoming publication.

In some implementations, system 200 uses one or more of the modules to anticipate or predict content that is interesting and important to users. For example, system 200 can provide one or more web-links to online resources that describe scientific data about general relativity based on a predicted interest of the user. System 200 uses the interest feeds to provide the web-links and other content with annotations that indicate a summary of the data, a type of the content (e.g., physics/science), and reason for why the content is provided.

Figure 4:
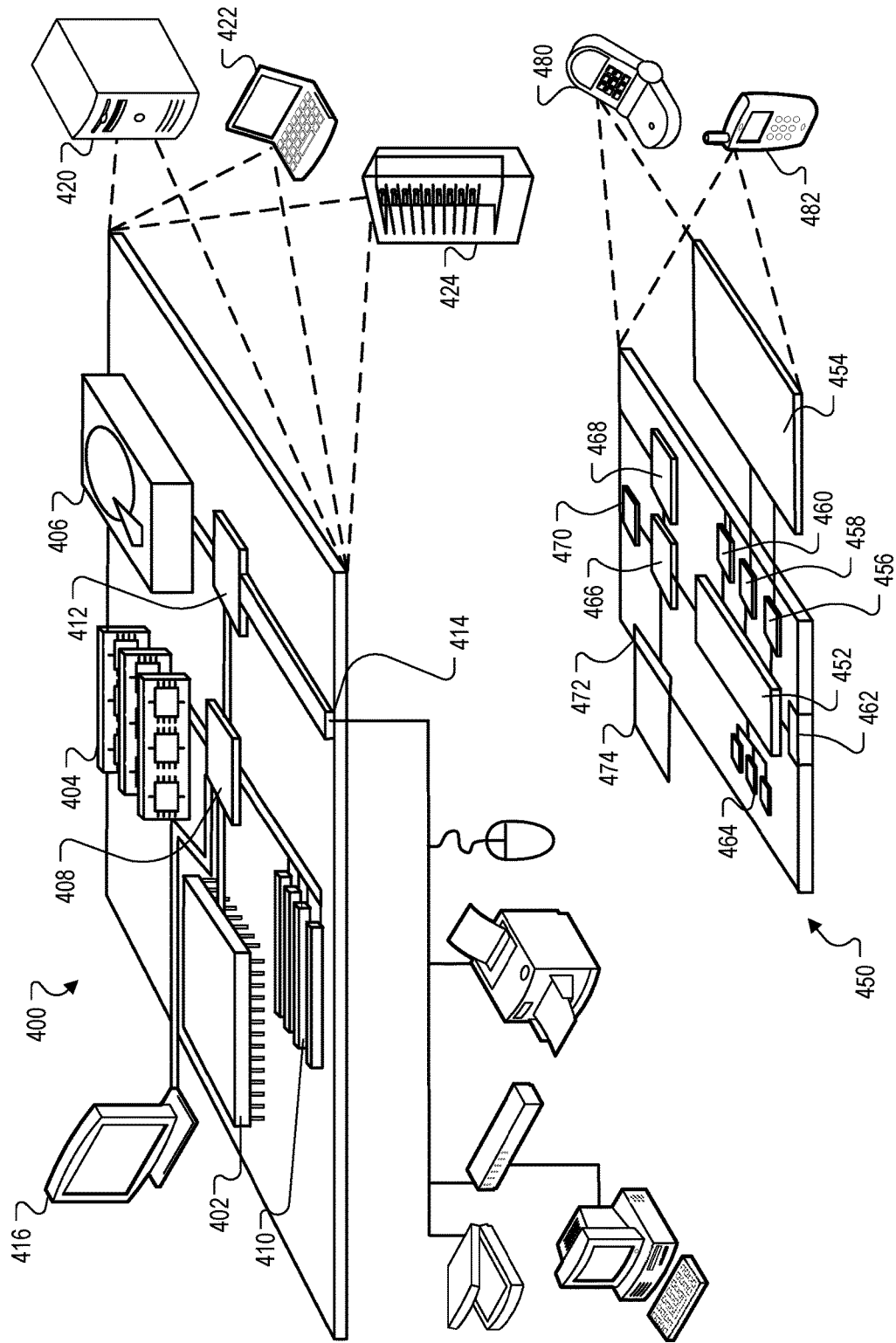
FIG. 4 is a block diagram of a computing system that can be used in connection with computer-implemented methods described in this specification.

FIG. 4 is a block diagram of computing devices 400, 450 that may be used to implement the systems and methods described in this document, either as a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed.

For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for populating an interest feed with electronic news article resources, comprising:

selecting, by a computing system and based on an interest list of a user, multiple electronic news article resources, each electronic news article resource including electronic media content comprising at least a portion of text content;

detecting, by the computing system, data similarities between a subset of the multiple electronic news article resources, wherein the data similarities comprise relative locations of certain portions of the text content of the subset of electronic news article resources;

identifying, by the computing system and based on the data similarities, two or more related entities that are associated with the subset of electronic news article resources;

selecting, by the computing system, at least one pair of entities from the two or more related entities based on a quantity of electronic news article resources of the subset in which the at least one pair of entities are associated with one another;

for the at least one pair of entities:
    determining, by the computing system and based on the quantity of electronic news article resources satisfying a threshold, that an event that is itself not included on the interest list of the user and that involves both entities of the pair is likely occurring;
    generating, by the computing system, a representation that corresponds to the event, the representation being generated based on one or more of the electronic news article resources in which each entity of the pair of entities is associated; and providing, by the computing system and for output to a user device, the representation that corresponds to the event on the interest feed.

2. The method of claim 1, comprising:
detecting particular entity terms included in the text content of the subset of electronic news article resources, the particular entity terms being detected based on a known interest included on the interest list of the user; and
in response to detecting the particular entity terms, selecting the at least one pair of entities, based on the detected particular entity terms.

3. The method of claim 1, comprising:
determining at least one interest of the user based on analysis of browsing session data of the user, the browsing session data being received during a current time period or a past time period; and
selecting the at least one pair of entities based on the determined at least one interest of the user.

4. The method of claim 1, wherein determining that the event is likely occurring, comprises:
identifying, using an event detection module of the computing system, multiple candidate events associated with the pair of entities;
using a filtering algorithm of the event detection module to produce a subset of candidate events associated with the electronic news article resources in which each entity of the pair of entities is included; and
determining that the event is likely occurring based on at least one event included in the subset of candidate events.

5. The method of claim 1, wherein selecting the at least one pair of entities comprises:
identifying a first entity based on a known interest on the interest list of the user;
determining, using a correlation detection module of the computing system, a second entity that has an association with the identified first entity; and
generating the at least one pair of entities based on the determined second entity and the identified first entity.

6. The method of claim 1, wherein generating the representation that corresponds to the event, comprises:
generating a summary of the electronic media content included in the one or more electronic news article resources in which each entity of the pair of entities is associated.

7. The method of claim 1, wherein generating the representation that corresponds to the event comprises:
determining a type of the event based on information about the event that is associated with the pair of entities; and
generating a second representation that includes a content item that is indicative of the type of event that is determined.

8. A system for populating an interest feed with electronic news article resources comprising:
one or more processing devices;
one or more non-transitory machine-readable storage devices for storing instructions that are executable by the one or more processing devices to cause performance of operations comprising:
    selecting, based on an interest list of a user, multiple electronic news article resources, each electronic news article resource including electronic media content comprising at least a portion of text content;
    detecting data similarities between a subset of the multiple electronic news article resources, wherein the data similarities comprise relative locations of certain portions of the text content of the subset of electronic news article resources;
    identifying, based on the data similarities, two or more related entities that are associated with the subset of electronic news article resources;
    selecting at least one pair of entities from the two or more related entities based on a quantity of electronic news article resources of the subset in which the at least one pair of entities are associated with one another;
    for the at least one pair of entities that are identified as topics of a particular electronic news article resource:
        determining, by the computing system and based on the quantity of electronic news article resources satisfying a threshold, that an event that is itself not included on the interest list of the user and that involves both entities of the pair is likely occurring;
        generating, by the computing system, a representation that corresponds to the event, the representation being generated based on one or more of the electronic news article resources in which each entity of the pair of entities is associated; and
    providing, by the computing system and for output to a user device, the representation that corresponds to the event on the interest feed.

9. The system of claim 8, wherein the operations comprise:
detecting particular entity terms included in the text content of the subset of electronic news article resources, the particular entity terms being detected based on a known interest included on the interest list of the user; and
in response to detecting the particular entity terms, selecting the at least one pair of entities, based on the detected particular entity terms.

10. The system of claim 8, wherein the operations comprise:
   determining at least one interest of the user based on analysis of browsing session data of the user, the browsing session data being received during a current time period or a past time period; and
   selecting the at least one pair of entities based on the determined at least one interest of the user.

11. The system of claim 8, wherein determining that the event is likely occurring, comprises:
   identifying, using an event detection module of the computing system, multiple candidate events associated with the pair of entities;
   using a filtering algorithm of the event detection module to produce a subset of candidate events associated with the electronic news article resources in which each entity of the pair of entities is included; and
   determining that the event is likely occurring based on at least one event included in the subset of candidate events.

12. The system of claim 8, wherein selecting the at least one pair of entities comprises:
   identifying a first entity based on a known interest on the interest list of the user;
   determining, using a correlation detection module of the computing system, a second entity that has an association with the identified first entity; and
   generating the at least one pair of entities based on the determined second entity and the identified first entity.

13. The system of claim 8, wherein generating the representation that corresponds to the event, comprises:
   generating a summary of the electronic media content included in the one or more electronic news article resources in which each entity of the pair of entities is associated.

14. The system of claim 8, wherein generating the representation that corresponds to the event comprises:
   determining a type of the event based on information about the event that is associated with the pair of entities; and
   generating a second representation that includes a content item that is indicative of the type of event that is determined.

15. One or more non-transitory machine-readable storage media for storing instructions that are executable by the one or more processing devices to cause performance of operations comprising:
   selecting, based on an interest list of a user, multiple electronic news article resources, each electronic news article resource including electronic media content comprising at least a portion of text content;
   detecting, by the computing system, data similarities between a subset of the multiple electronic news article resources, wherein the data similarities comprise relative locations of certain portions of the text content of the subset of electronic news article resources;
   identifying, by the computing system and based on the data similarities, two or more related entities that are associated with the subset of electronic news article resources;
   selecting, by the computing system, at least one pair of entities from the two or more related entities based on a quantity of electronic news article resources of the subset in which the at least one pair of entities are associated with one another;
   for the at least one pair of entities:
      determining, by the computing system and based on the quantity of electronic news article resources satisfying a threshold, that an event that is itself not included on the interest list of the user and that involves both entities of the pair is likely occurring;
      generating, by the computing system, a representation that corresponds to the event, the representation being generated based on one or more of the electronic news article resources in which each entity of the pair of entities is associated; and
   providing, by the computing system and for output to a user device, the representation that corresponds to the event on the interest feed.

16. The media of claim 15, wherein the operations comprise:
   detecting particular entity terms included in the text content of the subset of electronic news article resources, the particular entity terms being detected based on a known interest included on the interest list of the user; and
   in response to detecting the particular entity terms, selecting the at least one pair of entities, based on the detected particular entity terms.

17. The media of claim 15, wherein the operations comprise:
   determining at least one interest of the user based on analysis of browsing session data of the user, the browsing session data being received during a current time period or a past time period; and
   selecting the at least one pair of entities based on the determined at least one interest of the user.

18. The media of claim 15, wherein determining that the event is likely occurring, comprises:
   identifying, using an event detection module of the computing system, multiple candidate events associated with the pair of entities;
   using a filtering algorithm of the event detection module to produce a subset of candidate events associated with the electronic news article resources in which each entity of the pair of entities is included; and
   determining that the event is likely occurring based on at least one event included in the subset of candidate events.

19. The media of claim 15, wherein selecting the at least one pair of entities comprises:
   identifying a first entity based on a known interest on the interest list of the user;
   determining, using a correlation detection module of the computing system, a second entity that has an association with the identified first entity; and
   generating the at least one pair of identified entities based on the determined second entity and the identified first entity.

20. The media of claim 15, wherein generating the representation that corresponds to the event, comprises:
   generating a summary of the electronic media content included in the one or more electronic news article resources in which each entity of the pair of entities is associated.

* * * * *